United States Patent
Tian et al.

(10) Patent No.: US 7,929,482 B2
(45) Date of Patent: Apr. 19, 2011

(54) DATA RATE SELECTION IN A CONSTANT POWER VARIABLE DATA RATE TWO-WAY MOBILE SATELLITE COMMUNICATION LINK

(75) Inventors: Bin Tian, San Diego, CA (US); Judd Erlenbach, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 646 days.

(21) Appl. No.: 11/759,108

(22) Filed: Jun. 6, 2007

(65) Prior Publication Data

US 2008/0080410 A1 Apr. 3, 2008

Related U.S. Application Data

(60) Provisional application No. 60/839,506, filed on Aug. 22, 2006, provisional application No. 60/846,121, filed on Sep. 19, 2006.

(51) Int. Cl.
*H04B 7/185* (2006.01)
(52) U.S. Cl. ........................................ 370/318; 370/317
(58) Field of Classification Search .................... 370/317
See application file for complete search history.

(56) References Cited

U.S. PATENT DOCUMENTS

| | | | |
|---|---|---|---|
| 5,768,684 A * | 6/1998 | Grubb et al. | 455/13.4 |
| 6,810,246 B1 * | 10/2004 | Kalofonos et al. | 455/423 |
| 6,823,173 B2 * | 11/2004 | Srey et al. | 455/59 |
| 7,068,615 B2 * | 6/2006 | Niesen | 370/313 |
| 7,643,441 B2 * | 1/2010 | de La Chapelle et al. | 370/316 |
| 2003/0112878 A1 | 6/2003 | Kloper | |
| 2006/0104313 A1 * | 5/2006 | Haner et al. | 370/517 |

FOREIGN PATENT DOCUMENTS

| | | |
|---|---|---|
| WO | 0239622 | 5/2002 |
| WO | 03026189 | 3/2003 |

OTHER PUBLICATIONS

International Search Report, PCT/US07/076585, International Search Authority, European Patent Office, Feb. 19, 2008.
Written Opinion, PCT/US07/076585, International Search Authority, European Patent Office, Feb. 19, 2008.

* cited by examiner

*Primary Examiner* — Charles N Appiah
*Assistant Examiner* — Stamford Hwang
(74) *Attorney, Agent, or Firm* — Ashish L. Patel

(57) ABSTRACT

A method an apparatus for selecting a forward link and return link data rate for a constant power, variable data rate two-way, mobile satellite communications link. The forward link and return link signal strength (in the form of carrier power to noise power spectral density ratio) is measured, cataloged, and the values are used for the data rate selection. In addition, a ping can be sent by the network operation center to the mobile unit and the response to the ping is used for updating the information of both forward link and return link signal strength, so the chance of wrong data rate selection can be reduced. Multiple re-transmission attempts combined with gradually increased re-transmission margin ensures the proper data rate decision can be eventually achieved even with occasionally inaccurate signal strength information.

26 Claims, 5 Drawing Sheets

| INDEX | DATA RATE (BITS/SECOND) | MINIMUM REQUIRED FL $C/N_0$ (dB) |
|---|---|---|
| 0 | 12800 | 43.1 |
| 1 | 19200 | 44.8 |
| 2 | 25600 | 46.0 |
| 3 | 38400 | 47.7 |
| 4 | 51200 | 48.9 |
| 5 | 76800 | 50.7 |
| 6 | 102400 | 51.9 |
| 7 | 153600 | 53.6 |
| 8 | 204800 | 54.8 |
| 9 | 307200 | 56.6 |
| 10 | 409600 | 58.9 |
| 11 | 614400 | 59.6 |
| 12 | 921600 | 61.9 |
| 13 | 1228800 | 63.7 |

FIG. 3

| INDEX | DATA RATE (B/S) | MINIMUM REQUIRED RL $C/N_0$ (dB) |
|---|---|---|
| 0 | 50 | 25.5 |
| 1 | 75 | 26.6 |
| 2 | 100 | 27.5 |
| 3 | 150 | 28.8 |
| 4 | 200 | 29.8 |
| 5 | 300 | 31.2 |
| 6 | 400 | 32.3 |
| 7 | 600 | 33.8 |
| 8 | 800 | 35.0 |
| 9 | 1200 | 36.3 |
| 10 | 1600 | 37.5 |
| 11 | 2400 | 39.0 |
| 12 | 3200 | 40.2 |

FIG. 5

DATA RATE SELECTION IN A CONSTANT POWER VARIABLE DATA RATE TWO-WAY MOBILE SATELLITE COMMUNICATION LINK

CLAIM OF PRIORITY UNDER 35 U.S.C. §119

The present Application for Patent claims priority to Provisional Application No. 60/839,506 entitled "A CONSTANT POWER, VARIABLE DATA RATE TWO-WAY, MOBILE SATELLITE COMMUNICATIONS LINK" filed Aug. 22, 2006, and to Provisional Application No. 60/846,121 entitled "A CONSTANT POWER, VARIABLE DATA RATE TWO-WAY, MOBILE SATELLITE COMMUNICATIONS LINK" filed Sep. 19, 2006, which were both assigned to the assignee hereof and hereby expressly incorporated by reference herein.

BACKGROUND

1. Field

The present invention relates generally to communication systems, and more specifically to a method and apparatus for selecting a forward link and return link data rate is a constant power, variable data rate two-way, mobile satellite communications link.

2. Background

There is therefore a need in the art for an efficient constant power, variable data rate two-way, mobile satellite communications link. Typical satellite communication links are designed with excess link margin in order to overcome occasional link degradations. The result is that during normal link conditions, the link is not efficiently used, i.e., power is wasted.

SUMMARY

The present system solves the shortcomings of the prior art. In the present system, the link margin is varied by adjusting the over the air data rate in order to limit the wasted power and at the same time to improve the over the air data rate useable by each mobile terminal.

A constant fixed power is transmitted by the earth station (both the fixed earth station network operation center and the mobile terminals). The modulation used in both links is such that the receiving terminal can accumulate the received power until enough energy is received to demodulate the signal correctly. The receiving terminal feeds back information to the transmitter including the signal strength it measures which determines at what data rate it can demodulate. The transmitter remembers this information so that next time it is to send data to the receiver, it uses this information to determine the data rate. In both links (network operations center to terminal and terminal to network operations center) the transmitters (and subsequently the receivers) are able to send (receive) multiple different data rates, thus minimizing the wasted link power while simultaneously keeping the transmitter power fixed.

The present invention contains novel features such as the network operations center and terminal measure the forward link (FL) and return link (RL) carrier power to noise power spectral density ratio (C/No), neither the network operations center nor terminal get constant feedback from the network operations center/terminal, the network operations center sends a short "ping message" to a terminal to get a current FL C/No reading if the terminal has not been heard from recently, the network operations center and terminal use data rate selection algorithms as a best guess to choose the packet data rate to minimize excess link margin for both the initial packet transmission and subsequent retransmissions and the network operations center and terminal change the modulation symbol rate (not the power level) to create the packet data rate.

BRIEF DESCRIPTION OF THE DRAWINGS

FIG. 3 is an example of a table of FL data rates;

FIG. 5 is an example of a RL data rate table.

DETAILED DESCRIPTION

The purpose of the presently disclosed embodiments, hereinafter referred to as the Millennium System, is to drastically increase bandwidth efficiency (and thereby drastically reduce transponder cost) and capacity of the communications link between a network operation center (NOC) or hub to a Millennium data module (MDM). The Millennium System will maintain compatibility with other systems, such as OmniTRACS®, and interfaces to the dispatch centers and resident applications.

The Millennium forward link consists of variable rate data frames that are directed to terminals based on their ability to receive. Terminals receiving a strong signal will be sent data frames at a higher rate, whereas terminals receiving a weaker signal will be sent frames at a lower data rate. The subsequent sections describe the rate selection algorithm.

Figure 1:
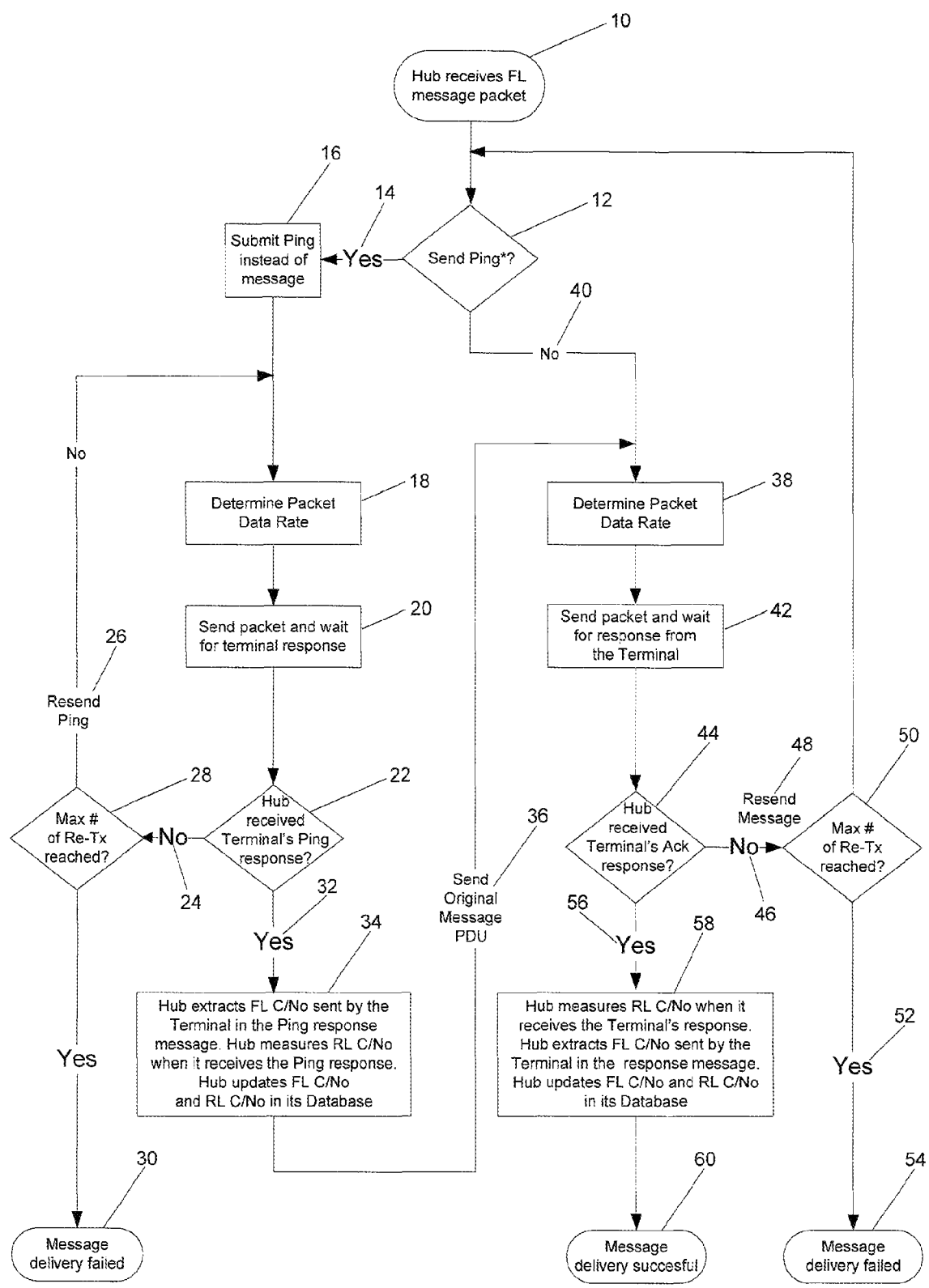
FIG. 1 is a flow chart showing the FL message packet transmission.

FIG. 1 is a flow chart showing the FL message packet transmission. The NOC receives a customer originated message to be delivered 10 to a customer mobile terminal and segments it (if necessary) into one or more Protocol Data Units (PDUs). If the terminal has not been in communication with the NOC for $T_{RP\_PingThreshold}$ sees or longer and the message length is greater than or equal to $L_{RP\_PingThreshold}$ bytes, then the NOC sends a "Ping" 12 PDU to the mobile unit. If the Ping is sent 14 a Ping PDU is created, and prepared for transmission 16 to the mobile unit. The forward link data rate used to send the Ping PDU is determined 18 as is the return data rate to be used by the terminal for the reply. The last known RL C/No from that terminal is also computed and inserted into the PDU. After the Ping is transmitted, the NOC waits a predetermined time for a response from the terminal 20. Next a determination is made whether the NOC has received the Ping response from the mobile terminal 22. If the predetermined time lapses and there is no response 24 from the terminal, the NOC resends the Ping 26 if the maximum number of attempts has not been reached 28. The data rate to send the Ping is recomputed 18 and the process repeats until either the maximum number of attempts is reached 28 in which case the message delivery is deemed foiled 30, or the terminal responds.

When the NOC receives the Ping reply PDU 32, it measures the RL C/No level of the received signal and stores it in its database for later use. The Ping reply PDU also contains the FL C/No level the terminal most recently measured. The NOC extracts that value and stores it in its database, also 34. The NOC then prepares for transmission the original message PDU 36. If a Ping is not necessary 40 or original message PDU in sent 36, the NOC computes the FL data rate to use for transmitting the PDU using the most recently saved FL C/No levels. The NOC also computes the RL data rate to be used by the terminal for its acknowledgment reply 38. The RL C/No to send to the terminal is also computed for it to use in its RL data rate selection algorithm. After the message PDU is transmitted, the NOC waits a predetermined time for a response from the terminal 42. Next, the NOC determines whether an acknowledgement (Ack) has been received from the terminal 44. If the predetermined time lapses and there is no response from the terminal 46, the NOC resends the message PDU 48 if the maximum number of transmission attempts has not been reached 50. If the maximum number of transmissions has been reached 52, the message delivery is deemed a failed delivery 54. The data rate used to retransmit the PDU is recomputed and the process repeats until either the maximum number of attempts is reached, or the terminal responds. If the NOC receives an acknowledgement from the terminal that it received the forward link message 56, the NOC saves the measured RL C/No of that signal and the FL C/No that is contained in the received PDU 58. After the acknowledgement is received, the NOC declares the message delivery to be successful and notifies the sender 60.

Figure 2:
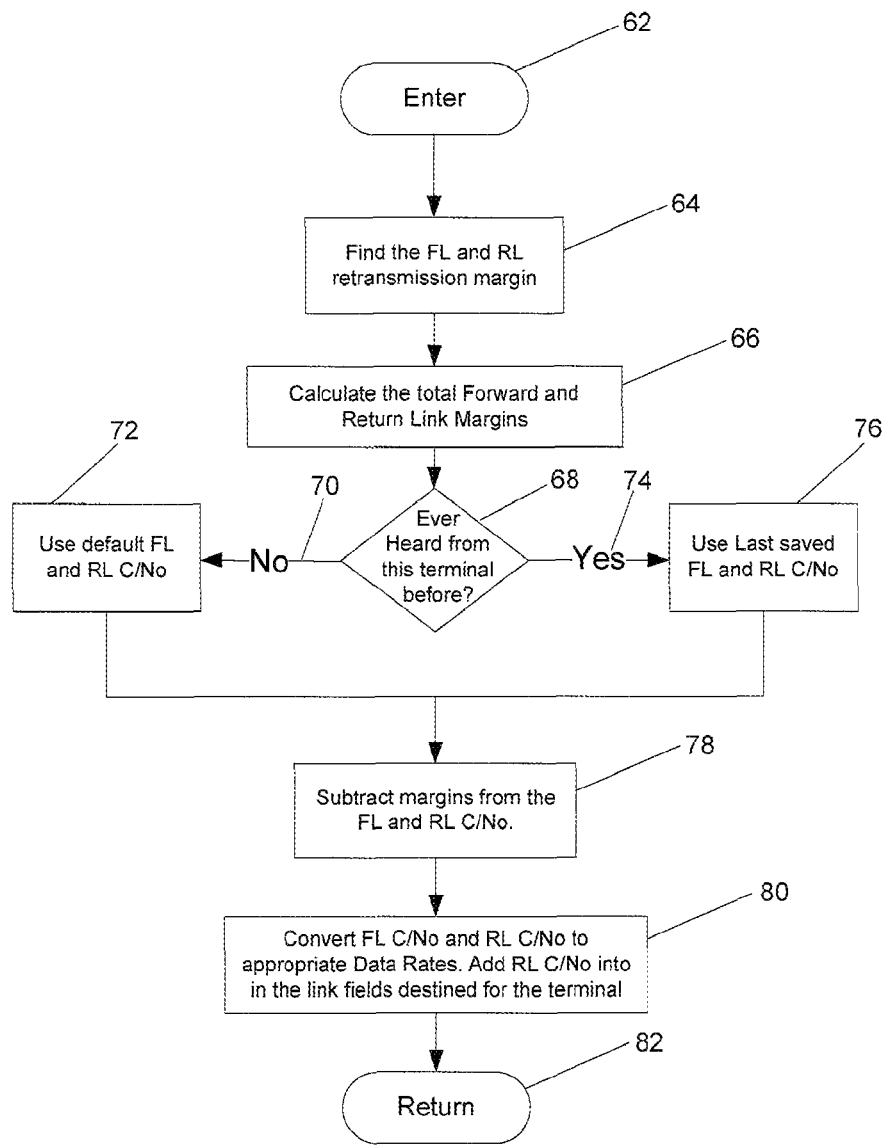
FIG. 2 is a flow chart describing the method for determining the packet data rate.

FIG. 2 is a flow chart describing the method for determining the packet data rate procedure as indicated in steps 18 and 38 of FIG. 1. The first step is to initiate or enter into the system 62. Using a look-up table with the transmission count as the index, the next step is to find the FL ($M_{r\_FL}$) and RL ($M_{r\_RL}$) retransmission margin value 64. Calculate the total forward link ($M_{total\_FL}$) and return link margin ($M_{total\_RL}$) 66 values as:

$$M_{total\_FL}=M_{r\_FL}+M_{p\_FL}+M_{m\_FL}+M_{b\_FL}$$

Where:
$M_{r\_FL}$ is forward link re-transmission margin.
$M_{p\_FL}$ is forward link priority margin,
$M_{m\_FL}$ is forward link message type margin.
$M_{m\_FL}$ is forward link balance margin.

$$M_{total\_RL}=M_{r\_RL}+M_{p\_RL}+M_{m\_RL}+M_{b\_RL}$$

Where:
$M_{r\_RL}$ is return link re-transmission margin.
$M_{p\_RL}$ is return link priority margin.
$M_{m\_RL}$ is return link message type margin.
$M_{b\_RL}$ is return link balance margin Next a determination is made whether the terminal has been heard from 68. If the NOC has never received any packets from the mobile terminal before 70, the NOC uses pre-determined, configurable values for default FL and RL $C/N_0$ values 72. If the NOC has received packets from the mobile terminal before 74. The NOC uses the last saved values for the FL and RL $C/N_0$ values for that terminal 76. The NOC then subtracts the total forward link margin ($M_{total\_FL}$) and total return link margin ($M_{total\_RL}$) from the FL and RL $C/N_0$ values 78 to get estimated FL and RL $C/N_0$ values, as defined by:

$$\text{Estimated FL } C/N_0=(\text{Last Known FL } C/N_0)-M_{total\_FL}$$

$$\text{Estimated RL } C/N_0=(\text{Last Known RL } C/N_0)-M_{total\_RL}$$

Finally, the estimated FL and RL $C/N_0$ values are used to look-up FL and RL data rates to use for the packet. The RL data rate is used by the mobile terminal for the packet response. The NOC measured R/L $C/N_0$ is also sent to the terminal in the packet 80, so that the terminal can make subsequent R/L data rate determinations wherein the systems returns 82 to the appropriate steps of FIG. 1.

An example of FL data rates for selection is shown in the table of FIG. 3. In this particular embodiment, the data rate table is configurable and can be expanded up to 31 FL data rates. This limitation is based on the available number of Walsh Codes, which are identified by the receiver to identify the data rates.

Figure 4:
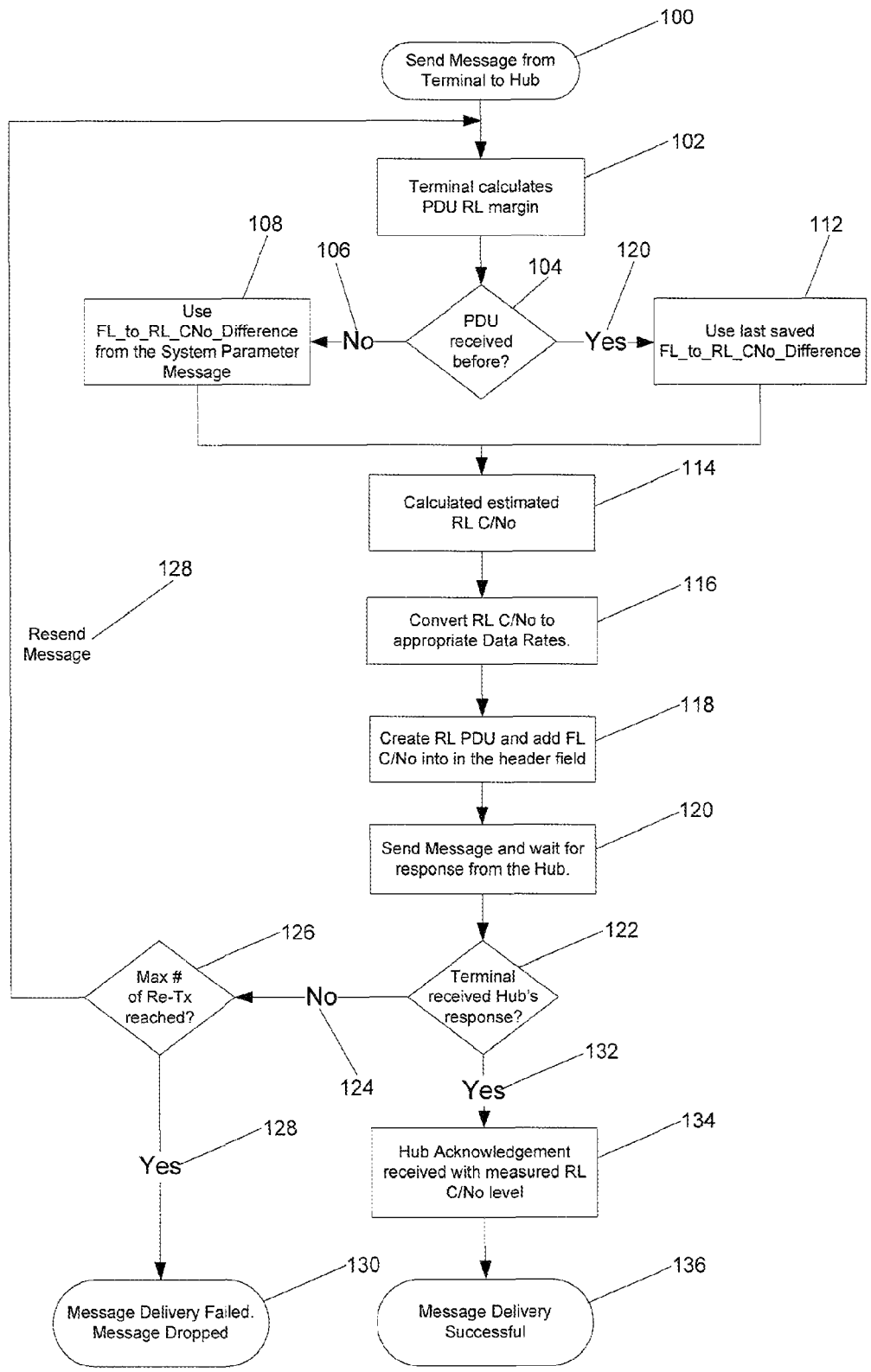
FIG. 4 is a flow chart of the preferred data rate determination for the RL message.

FIG. 4 is a flow chart showing the return link message packet transmission. As shown in FIG. 4, the mobile terminal receives a customer originated message to be sent or delivered to NOC 100 and segments it (if necessary) into one or more Protocol Data Units (PDUs). The terminal calculates the margin 102 to use when determining the RL data rate as:

$$\text{PDU Margin}=M_p+M_m+M_b+M(i)_{retx}$$

Where:
$M_p$=PDU priority margin
$M_m$=PDU type margin
$M_b$=Balance margin
$M(i)_{retx}$=The ith retransmit schedule margin Depending on whether the terminal has received a PDU from the NOC1 since it powered on 104, the terminal takes one of two actions.

If the terminal has not received 106 any PDUs from the NOC since it powered on, the terminal uses the system default value of FL_to_RL_CNo_Difference it has received from the NOC in the broadcasted System Parameters message 108 in its next calculation. If the terminal has received 110 a PDU from the NOC since it powered on, the terminal uses the latest value of FL_to_RL_CNo_Difference 112 that it has previously computed using the RL_CNo feedback in the last PDU from the NOC in its next calculation.

The terminal then calculates an estimated RL C/No level 114 as:

$$\text{Estimated RL } C/N_0=\text{FL } C/\text{No}-\text{FL\_to\_RL\_CNo\_Difference}-\text{PDU Margin}$$

Where:
FL C/No=The FL C/No the terminal is currently measuring

The terminal converts the estimated RL C/No to a data rate 116 to use when transmitting the PDU through a table look-up. The terminal creates the RL PDU and inserts the recently measured FL C/No into the PDU header 118 for the NOC to use in its FL data rate determination calculations. The PDU is transmitted and the terminal waits for a response from the NOC 120. The terminal also saves the recently measured FL C/No. The terminal waits a predetermined time for the NOC response 122. Depending on whether a response is received, the terminal performs one of two actions. If the terminal does not receive 124 a response from the terminal and if the maximum number of transmit attempts has not been reached 126, the terminal re-transmits or resends the PDU 128 after computing a new estimated RL C/No and PDU data rate. If the maximum number of transmission attempts has been reached 128, the terminal drops the message 130.

If the terminal has received the NOC's response 132, it extracts the last RL C/No level 134 the NOC measured from the response message. The terminal uses that RL C/No level and the previously saved FL C/No to compute a new value of FL_to_RL_CNo_Difference. The terminal drops the message and considers it successfully delivered 136.

An example of RL data rates for selection is shown in the table of FIG. 5. In this particular embodiment, the data rate table is configurable and can be expanded up to 16 RL data rates.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein, but is to be accorded the widest scope consistent with the principles and novel features disclosed herein.

What is claimed is:

1. A method for selecting a forward link data rate and a return link data rate for a mobile satellite communications link, the method comprising the steps of:
   determining a forward link retransmission margin value and a return link retransmission margin value;
   calculating, by a processor, a total forward link margin and a total return link margin,
   wherein the total forward link margin comprises a sum of the forward link retransmission margin value, a forward link priority margin, a forward link message type margin, and a forward link balance margin;
   computing a last known forward link carrier power to noise power spectral density ratio and a last known return link carrier power to noise power spectral density ratio;
   subtracting the total forward link margin from the last known forward link carrier power to noise power spectral density ratio to obtain an estimated forward link carrier power to noise power spectral density ratio;
   subtracting the total return link margin from the last known return link carrier power to noise power spectral density ratio to obtain an estimated return link carrier power to noise power spectral density ratio; and
   selecting the forward link data rate and the return link data rate from the estimated forward link carrier power to noise power spectral density ratio and the estimated return link carrier power to noise power spectral density ratio.

2. The method of claim 1 wherein determining the forward link retransmission value and the return link retransmission margin value comprises using a look-up table with a transmission count as an index.

3. The method of claim 1 wherein computing the total return link margin comprises summing the return link retransmission margin value, a return link priority margin, a return link message type margin and a return link balance margin.

4. The method of claim 1 further comprising sending a ping to a mobile unit for determining the forward link rate and the return link data rate.

5. The method of claim 1 wherein computing the last known forward link carrier power to noise power spectral density ratio and the return link carrier power to noise power spectral density ratio comprises using default values for the last known forward link carrier power to noise power spectral density ratio and the return link carrier power to noise power spectral density ratio.

6. The method of claim 1 wherein selecting the forward link data rate and the return link data rate comprises using data rate look-up tables.

7. A non-transitory computer readable medium having computer executable instructions for performing a method, the method comprising the steps of:
   determining a forward link retransmission margin value for a mobile satellite communications link;
   calculating a total forward link margin, wherein the total forward link margin comprises a sum of the forward link retransmission margin value, a forward link priority margin, a forward link message type margin, and a forward link balance margin;
   computing a last known forward link carrier power to noise power spectral density ratio;
   subtracting the total forward link margin from the last known forward link carrier power to noise power spectral density ratio to obtain an estimated forward link carrier power to noise power spectral density ratio; and
   selecting a forward link data rate from the estimated forward link carrier power to noise power spectral density ratio.

8. The method of claim 7 wherein determining the forward link retransmission margin value comprises using a look-up table with a transmission count as an index.

9. The method of claim 7 further comprising sending a ping to a mobile unit for determining the forward link data rate.

10. The method of claim 7 wherein computing the last known forward link carrier power to noise power spectral density ratio comprises using a default value for the last known forward link carrier power to noise power spectral density ratio.

11. The method of claim 7 wherein selecting the forward link data rate comprises using a forward link data rate look-up table.

12. A non-transitory computer readable medium having computer executable instructions for performing a method, the method comprising the steps of:
- determining a return link retransmission margin value for a mobile satellite communications link;
- calculating a total return link margin, wherein the total return link margin comprises a sum of the return link retransmission margin value, a return link priority margin, a return link message type margin, and a return link balance margin;
- computing a last known return link carrier power to noise power spectral density ratio;
- subtracting the total return link margin from the last known return link carrier power to noise power spectral density ratio to obtain an estimated return link carrier power to noise power spectral density ratio; and
- selecting a return link data rate from the estimated return link carrier power to noise power spectral density ratio.

13. The method of claim 12 wherein determining the return link retransmission margin value comprises using a look-up table with a transmission count as an index.

14. The method of claim 12 further comprising sending a ping to a mobile unit for determining the return link data rate.

15. The method of claim 12 wherein computing the last known return link carrier power to noise power spectral density ratio comprises using a default value for the last known return link carrier power to noise power spectral density ratio.

16. The method of claim 12 wherein selecting the return link data rate comprises using a return link data rate look-up table.

17. A system for selecting a forward link and return link data rate for a mobile satellite communications link, the system comprising:
- a means for determining a forward link retransmission margin value and a return link retransmission margin value;
- a means for calculating a total forward link margin and a total return link margin, wherein the total forward link margin comprises a sum of the forward link retransmission margin value, a forward link priority margin, a forward link message type margin, and a forward link balance margin;
- a means for computing a last known forward link carrier power to noise power spectral density ratio and a last known return link carrier power to noise power spectral density ratio;
- a means for subtracting the total forward link margin from the last known forward link carrier power to noise power spectral density ratio to obtain an estimated forward link carrier power to noise power spectral density ratio;
- a means for subtracting the total return link margin from the last known return link carrier power to noise power spectral density ratio to obtain an estimated return link carrier power to noise power spectral density ratio; and
- a means for selecting the forward link data rate and the return link data rate from the estimated forward link carrier power to noise power spectral density ratio and the estimated return link carrier power to noise power spectral density ratio.

18. An apparatus for selecting a forward link data rate and a return link data rate for a mobile satellite communications link, comprising:
- a hub configured to:
  - determine a forward link retransmission margin value and a return link retransmission margin value;
  - calculate a total forward link margin and a total return link margin, wherein the total forward link margin comprises a sum of the forward link retransmission margin value, a forward link priority margin, a forward link message type margin, and a forward link balance margin;
  - compute a last known forward link carrier power to noise power spectral density ratio and a last known return link carrier power to noise power spectral density ratio;
  - subtract the total forward link margin from the last known forward link carrier power to noise power spectral density ratio to obtain an estimated forward link carrier power to noise power spectral density ratio;
  - subtract the total return link margin from the last known return link carrier power to noise power spectral density ratio to obtain an estimated return link carrier power to noise power spectral density ratio; and
  - select the forward link data rate and the return link data rate from the estimated forward link carrier power to noise power spectral density ratio and the estimated return link carrier power to noise power spectral density ratio.

19. The apparatus of claim 18 wherein the hub is further configured to send a ping to a mobile unit to determine the forward link data rate and the return link data rate.

20. A method of selecting a return link data rate, comprising:
- determining a return link retransmission margin value for a mobile satellite communications link;
- calculating, by a processor, a total return link margin, wherein the total return link margin comprises a sum of the return link retransmission margin value, a return link priority margin, a return link message type margin, and a return link balance margin;
- computing a last known return link carrier power to noise power spectral density ratio;
- subtracting the total return link margin from the last known return link carrier power to noise power spectral density ratio to obtain an estimated return link carrier power to noise power spectral density ratio; and
- selecting the return link data rate from the estimated return link carrier power to noise power spectral density ratio.

21. The method of claim 20 wherein determining the return link retransmission margin value comprises using a look-up table with a transmission count as an index.

22. The method of claim 20 further comprising sending a ping to a mobile unit for determining the return link data rate.

23. The method of claim 20 wherein computing the last known return link carrier power to noise power spectral density ratio comprises using a default value for the last known return link carrier power to noise power spectral density ratio.

24. The method of claim 20 wherein selecting the return link data rate comprises using a return link data rate look-up table.

25. A system for selecting a return link data rate, comprising:
- means for determining a return link retransmission margin value for a mobile satellite communications link;

means for calculating a total return link margin, wherein the total return link margin comprises a sum of the return link retransmission margin value, a return link priority margin, a return link message type margin, and a return link balance margin;

means for computing a last known return link carrier power to noise power spectral density ratio;

means for subtracting the total return link margin from the last known return link carrier power to noise power spectral density ratio to obtain an estimated return link carrier power to noise power spectral density ratio; and means for selecting the return link data rate from the estimated return link carrier power to noise power spectral density ratio.

26. An apparatus for selecting a return link data rate for a mobile satellite communications link, comprising:

a terminal configured to:
    determine a return link retransmission margin value for a mobile satellite communications link;
    calculate a total return link margin, wherein the total return link margin comprises a sum of the return link retransmission margin value, a return link priority margin, a return link message type margin, and a return link balance margin;
    compute last known return link carrier power to noise power spectral density ratio;
    subtract the total return link margin from the last known return link carrier power to noise power spectral density ratio to obtain an estimated return link carrier power to noise power spectral density ratio; and
    select the return link data rate from the estimated return link carrier power to noise power spectral density ratio.

\* \* \* \* \*